(12) United States Patent
Hashimoto

(10) Patent No.: US 7,252,609 B2
(45) Date of Patent: Aug. 7, 2007

(54) LEVER FOR TRANSMISSION DEVICE

(75) Inventor: Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 565 days.

(21) Appl. No.: 10/851,747

(22) Filed: May 21, 2004

(65) Prior Publication Data
US 2005/0026730 A1  Feb. 3, 2005

(30) Foreign Application Priority Data
Jul. 31, 2003  (JP) .............................. 2003-284125

(51) Int. Cl.
*F16H 7/18* (2006.01)
*F16H 7/22* (2006.01)

(52) U.S. Cl. ..................................... 474/111

(58) Field of Classification Search ................ 474/111, 474/140, 101, 109
See application file for complete search history.

(56) References Cited

U.S. PATENT DOCUMENTS

| 4,826,468 A | 5/1989 | Friedrichs |
| 6,036,613 A * | 3/2000 | Diehm ........................ 474/111 |
| 6,086,498 A * | 7/2000 | Hashimoto ................ 474/111 |
| 6,302,817 B1 | 10/2001 | Maute |
| 6,645,102 B2 | 11/2003 | Kumakura |
| 2003/0139237 A1 | 7/2003 | Konno et al. |

FOREIGN PATENT DOCUMENTS

| EP | 1 300 607 A2 | 4/2003 |
| EP | 1 300 608 A2 | 4/2003 |
| EP | 1 304 505 A1 | 4/2003 |
| GB | 2 371 613 A | 7/2002 |
| JP | 56-83647 A * | 7/1981 ................ 474/111 |
| JP | 5-42798 | 6/1993 |
| JP | 08-254253 | 10/1996 |
| JP | 2000-230611 A * | 8/2000 |
| JP | 3253951 | 11/2001 |
| JP | 2002-181145 | 6/2002 |

* cited by examiner

*Primary Examiner*—Marcus Charles
(74) *Attorney, Agent, or Firm*—Howson & Howson LLP (57) ABSTRACT

In a lever for a transmission device comprising a lever body including a shoe and a support on the back of the shoe, the lever body is integrally molded of a synthetic resin, and a metal reinforcing plate is held on the support so that it extends along the longitudinal direction of the lever body. The lever body and the metal reinforcing plate are integrally formed by insert molding using the metal reinforcing plate as an insert fitting.

4 Claims, 6 Drawing Sheets

LEVER FOR TRANSMISSION DEVICE

FIELD OF THE INVENTION

This invention relates to a transmission device in which an endless, flexible transmission medium, such as a chain, transmits power from a driving sprocket to one or more driven sprockets. The invention relates more specifically to an improvement in the structure of a lever used in conjunction with a tensioner for maintaining proper tension in the flexible transmission medium.

BACKGROUND OF THE INVENTION

In an internal combustion engine, an endless chain is typically used as a transmission medium for transmitting rotation from the engine crankshaft to one or more valve-operating camshafts. The chain is in mesh with sprockets on the crankshaft and camshafts, which are of a size such as to transmit rotation from the crankshaft to camshafts at the required ratio. In such a transmission device, to ensure smooth power transmission, a lever is pressed by a tensioner into sliding contact with the traveling chain or other endless, flexible power transmission medium in order to apply appropriate tension to the medium. A side of the lever extending in the longitudinal direction forms a shoe which has a surface adapted for sliding contact with the transmission medium. The lever is pivoted at one end to the frame of an engine on a bolt, pin or the like, and a plunger of the tensioner abuts the lever near its opposite end on the side opposite the shoe.

Figure 7:
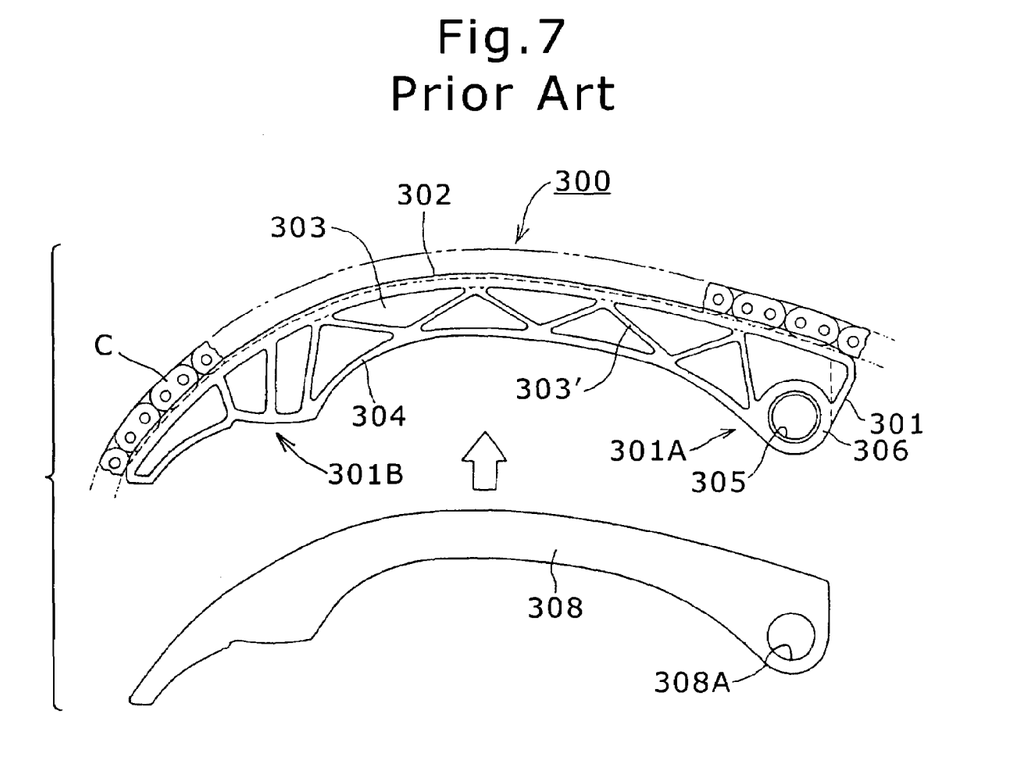
FIG. 7 is a side view of a conventional lever for a transmission device.
Figure 8:
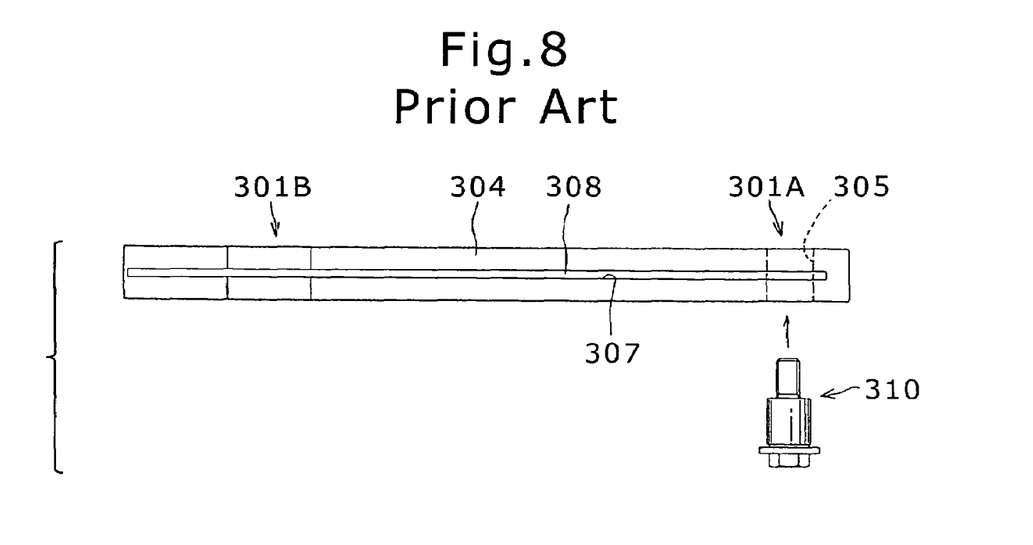
FIG. 8 is a bottom plan view of conventional lever.

FIGS. 7 and 8 show a lever 300 described in Japanese Patent No. 3253951. This lever comprises a lever body 301 having a shoe 302 with a surface for sliding contact with a traveling chain C, and a support 303 extending longitudinally on the back of the shoe 302 is integrally molded with the shoe, from a synthetic resin. A reinforcing plate 308 made of a rigid material fits into a longitudinally extending slot 307, the opening of which is located centrally with respect to the width of the support 303. Adjacent one end, the support 303 is provided with a mounting hole 305, through which a shaft 310 extends for pivoting the lever to the frame of an engine. The reinforcing plate 308 has a hole 308A located so that it can come into register with the mounting hole 305 when the reinforcing plate is inserted into the slot 307. The lever body 301 and the reinforcing plate 308 are held together by virtue of the fact that the shaft 310 extends through both the mounting hole 305 of the support, and the hole 308 A of the reinforcing plate.

Since the lever body comprises the shoe 302, integrally molded with the support 303 from a synthetic resin, the lever body 301 itself provides a surface on which the flexible transmission medium can slide, and it is not necessary to provide a separate shoe. As a result, the number of parts and production steps is reduced. Furthermore, since the opening of slot 307 faces in a direction perpendicular to the shoe and extends longitudinally along the lever, the reinforcing plate 308, which fits into the slot 307, increases the strength of the lever in the direction of the plane in which the pivoting movement of the lever takes place. As a result, the rigidity against bending, the toughness, and the strength, of the lever 300 is significantly improved.

In the above-mentioned lever 300, which is known as a "slide-in lever", the lever body 301 and the reinforcing plate fitted are separately molded. Thus, the lever presents some further problems. Specifically, in order for the reinforcing plate 308 and the slot 307 conform to each other, the support 303 must be molded with a high degree of accuracy.

Another problem is that significant assembly effort is required to align the mounting hole 305 and the hole 308A of the reinforcing plate 308 during assembly.

Still another problem is the prevention of shifting of the reinforcing plate in the lever as the lever is mounted on an engine frame.

Noises are also generated at the location at which the reinforcing plate is mounted rotatably on shaft 310 and at the location at which the plunger of the tensioner abuts the reinforcing plate.

Accordingly, objects of the invention are to solve the problems of the conventional slide-in tensioner lever, and to provide a tensioner lever that does not require high molding accuracy, does not require alignment of the lever body and the reinforcing plate when the assembly is mounted on a pivot shaft, and reduces noise due to contact of the reinforcing plate with the pivot shaft and the tensioner plunger.

SUMMARY OF THE INVENTION

A lever for a transmission device according to the invention comprises an elongated lever body, including a shoe having a front surface adapted for sliding contact with a traveling transmission medium, and a support extending longitudinally along the back of the shoe and substantially in a direction opposite to the direction in which the front surface of the shoe faces. The lever body is integrally molded of a synthetic resin, and a metal reinforcing plate, held on the support at the center of the width direction of the support, extends longitudinally along the lever body. The lever has a fixed part adjacent one end thereof, with a mounting hole at the location of the fixed part for receiving a pivot shaft on which the lever is pivotable. The lever has a movable part adjacent the other end thereof. The mounting hole extends through the support and the metal reinforcing plate, and at least a part of the lever body and the metallic reinforcing plate are integrally insert-molded, the metal reinforcing plate being an insert fitting.

Preferably, the inner circumferential surface of the mounting hole is covered with the same synthetic resin that forms the lever body.

The lever also preferably has a tensioner plunger-abutting pad integrally insert-molded with the metal reinforcing plate, the plate being an insert fitting.

The composition of the synthetic resin which forms the lever body is not particularly limited. However, since a sliding contact surface for engagement with a chain or other traveling transmission medium is provided, the synthetic resin is preferably a polyamide resin or the like, exhibiting excellent wear resistance, lubricating properties, and oil resistance, such as the so called engineering plastics, sometimes designated by the abbreviation "enpla"). Furthermore, addition of glass fibers allows further improvements of impact resistance, bending strength and other mechanical properties. On the other hand, if the materials of the metallic reinforcing plate have significant bending rigidity and bending strength, which are required for the lever for the transmission device, they are not limited particularly. The metals of which the reinforcing plate is formed can be, and preferably are, ferrous metals or nonferrous metals such as aluminum, magnesium, titanium and the like.

Insert molding allows the lever body and the metallic reinforcing plate to be molded together without the need of high molding accuracy. Positioning of the lever body and the metallic reinforcing plate and the like are not needed and manufacturing costs and manufacturing steps are reduced.

Where the inner circumferential surface of the mounting hole is covered with the same synthetic resin that forms the lever body, direct contact between the pivot shaft and the reinforcing plate is avoided, quietness is enhanced, and smooth pivoting operation can be realized. Furthermore, since the metal reinforcing plate is not fixed relative to the lever body except at the end thereof having the mounting hole, differences in heat shrinkage or expansion, between the metallic reinforcing plate and the lever body, are absorbed.

Where a plunger-abutting pad is integrally formed with the metal reinforcing plate by insert molding, using the metal reinforcing plate as an insert fitting, direct contact between the plunger and the metal reinforcing plate is avoided, quietness of operation is enhanced, wear of the plunger is suppressed, and a long life of the tensioner device can be obtained.

DETAILED DESCRIPTION OF THE PREFERRED EMBODIMENTS

Figure 1:
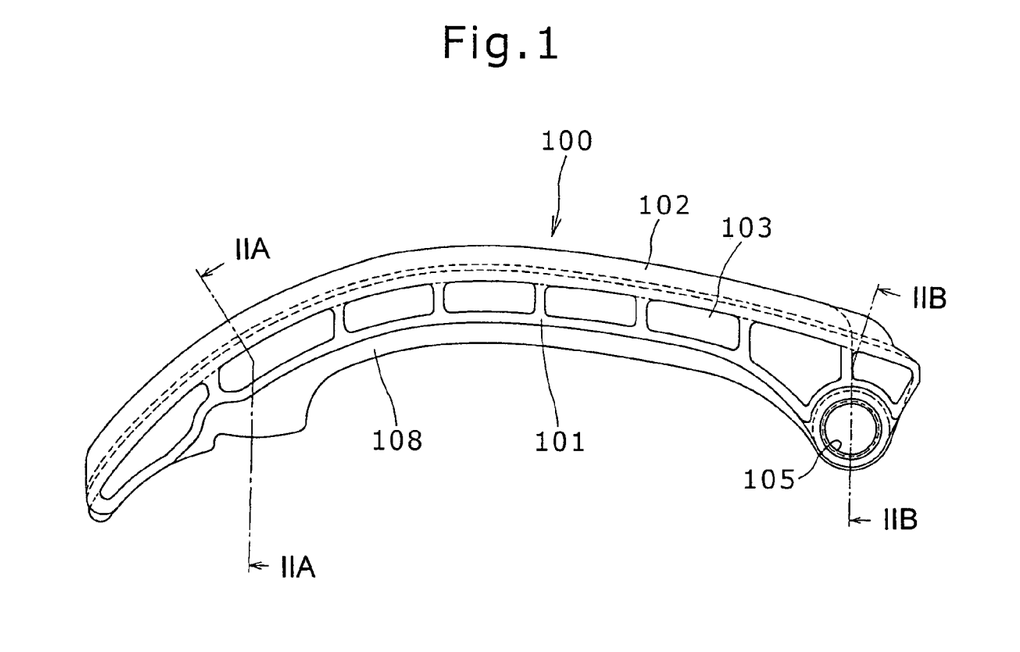
FIG. 1 is a side view of a lever for a transmission device according to first embodiment of the invention.

The lever 100 shown in FIG. 1 comprises a lever body 101, integrally molded of a synthetic resin, and including a shoe 102 having a front side for sliding contact with a traveling transmission medium, and a support 103 extending perpendicularly from the back side of the shoe along the longitudinal direction of the lever. A metal reinforcing plate 108 is held in the middle of the support 103 in the widthwise direction. A fixed end of lever 100 is provided with a mounting hole 105, into which a pivot shaft is fitted. The mounting hole 105 extends through the support 103 and the metal reinforcing plate 108, as shown in FIG. 2(B).

In the invention, the lever is formed by an insert mold method, using the metal reinforcing plate 108 as an insert so that at least a part of the lever body 101 is integrated with the reinforcing plate 108.

Figure 5:
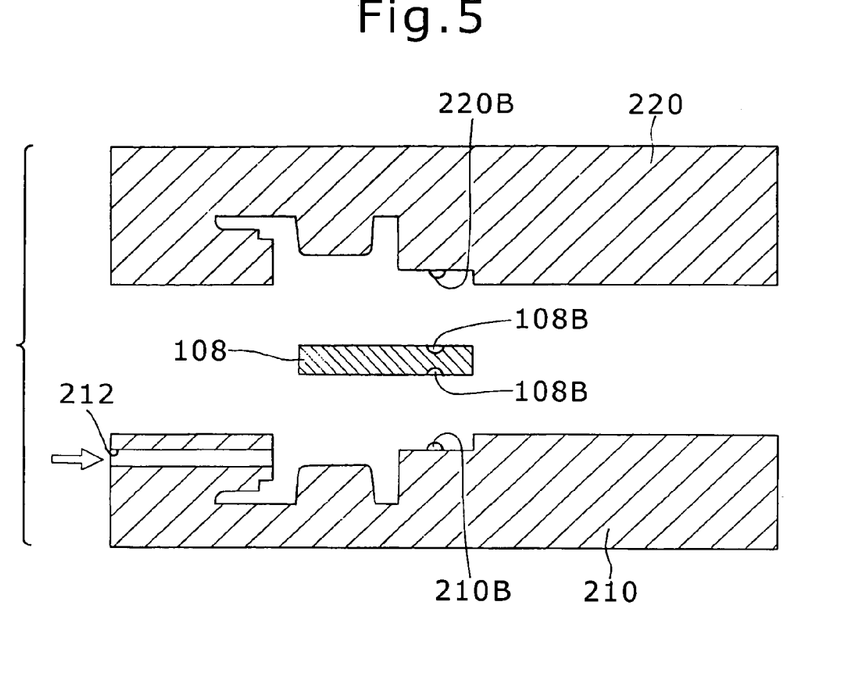
FIG. 5 is a schematic view explaining an insert molding method used to produce a lever in accordance with the invention.
Figure 6:
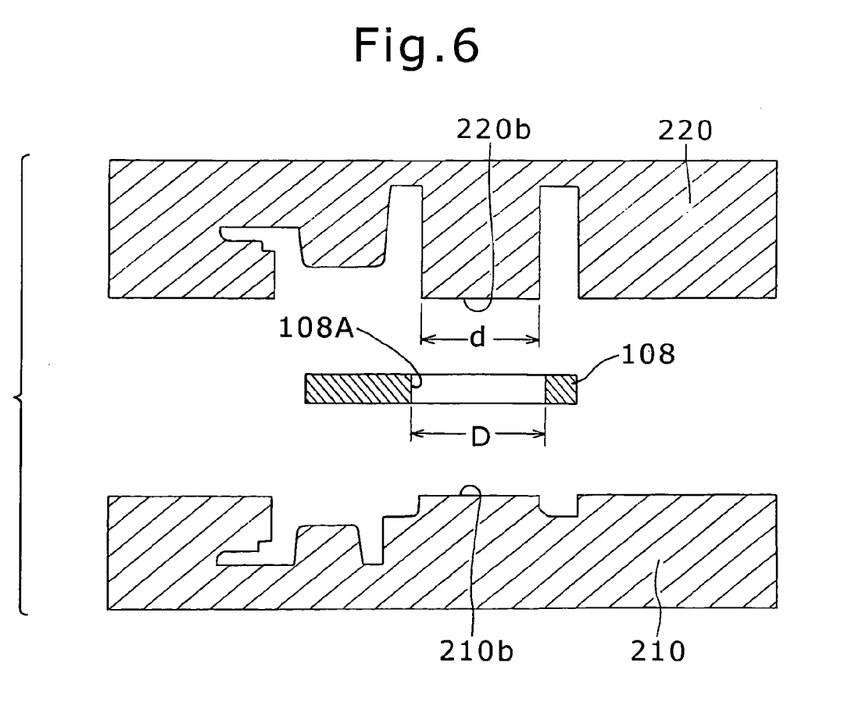
FIG. 6 is another schematic view explaining an insert molding method.

Integration of the lever body 101 and the metal reinforcing plate 108 by the use of an insert mold method will be described with reference to FIGS. 5 and 6. FIG. 5 corresponds to a section taken on surface IIA-IIA in FIG. 1, and FIG. 6 corresponds to a section taken on surface IIB-IIB in FIG. 1.

First, two split mold parts 210 and 220, forming a shape of a lever, are prepared. Then a metal reinforcing plate 108 is placed on one mold part 210 and covered by the other mold part 220. Pressure is applied to the split mold so that the parts 210 and 220 tightly contact each other. Molten synthetic resin is then injected through an injection hole 212, shown in FIG. 5. After the synthetic resin runs throughout the inside of the mold and is cooled and cured, the mold is opened, lands are removed, and a lever, in which the lever body 101 and a part of the metal reinforcing plate 108 are integrated, is released from the mold. Convex portions 210B and 220B in FIG. 5, respectively provided in the two mold parts 210 and 220, and concave recesses 108B in the metal reinforcing plate 108 are not essential. However, the engagement of these convex portions with the recesses in the reinforcing plate assists in easy and reliable positioning of the reinforcing plate relative to the split mold parts. Furthermore the through hole 108A in the reinforcing plate, as shown in FIG. 6 has an inner diameter D slightly larger than the inner diameter d of the mounting hole 105, as shown in FIG. 2(B). The difference between diameters D and d allows synthetic resin to flow into the gap between the inner circumferential surface of the insertion through hole 108A and the two split mold parts in the process of injection molding. Consequently, the inner circumferential surface of the mounting hole 105 of the lever is covered with the synthetic resin which forms the lever body 101, and direct contact between the mounting shaft and the metallic reinforcing plate is prevented.

Figure 2A:
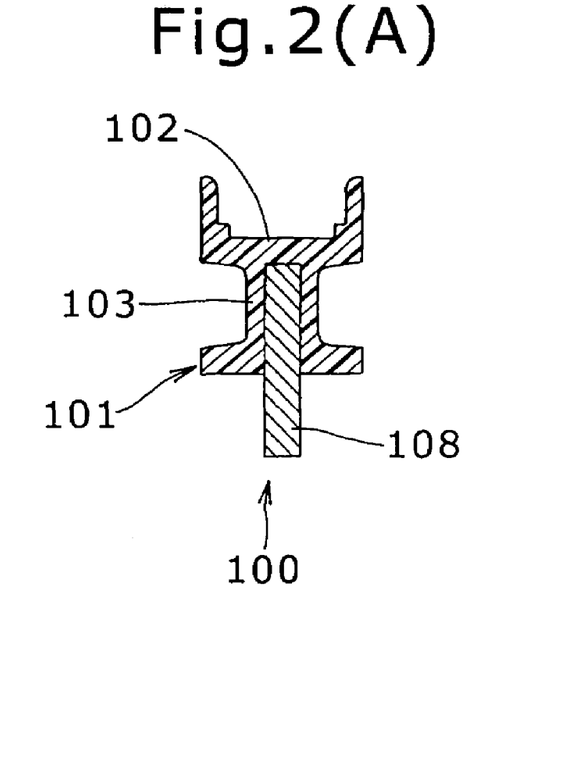
FIG. 2(A) is a cross-sectional view taken on surface IIA-IIA in FIG. 1.
Figure 2B:
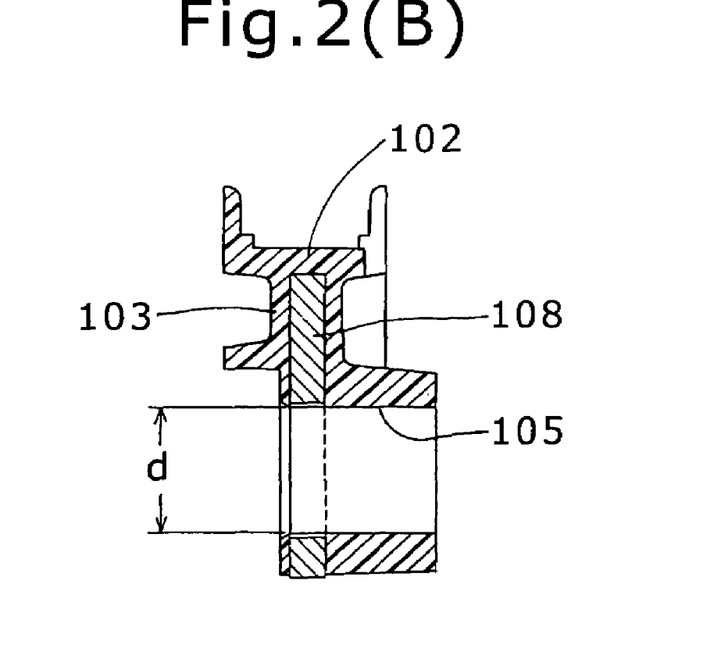
FIG. 2(B) is a cross sectional view taken on surface IIB-IIB in FIG. 1.

As shown in FIGS. 1 and 2, a part of the metallic reinforcing plate 108 is integrated with the lever body 101 and the other parts thereof are exposed. Thus even if there is a difference in rate of thermal expansion between the lever body 101 and the metallic reinforcing plate 108, no excessive stress is generated therebetween and the generation of cracks in the lever body can be prevented.

Figure 3:
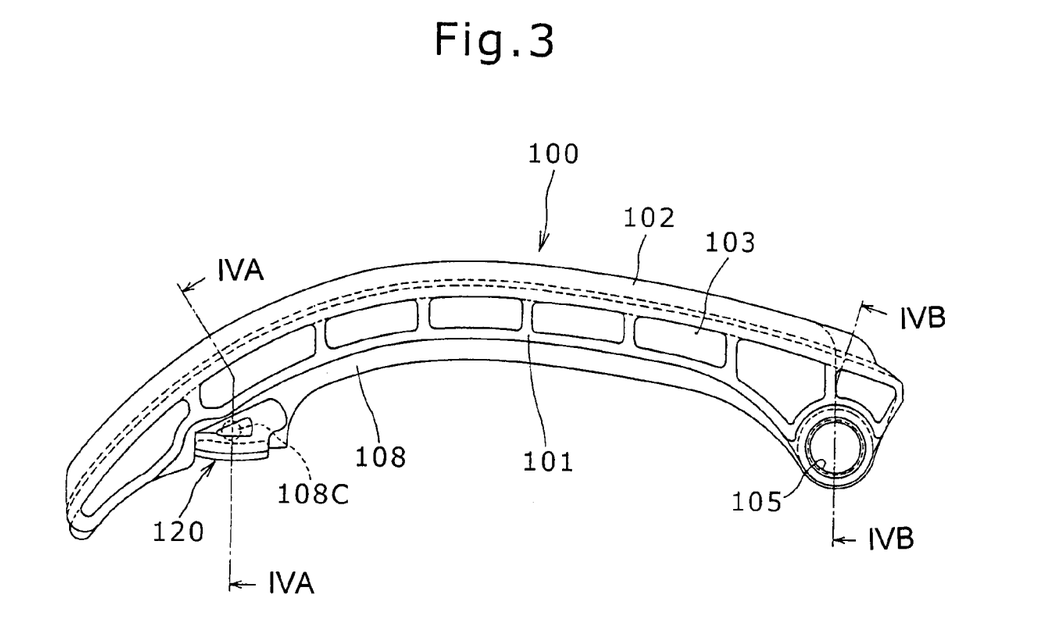
FIG. 3 is a side view of a lever for a transmission device according to a second embodiment of the invention.
Figure 4A:
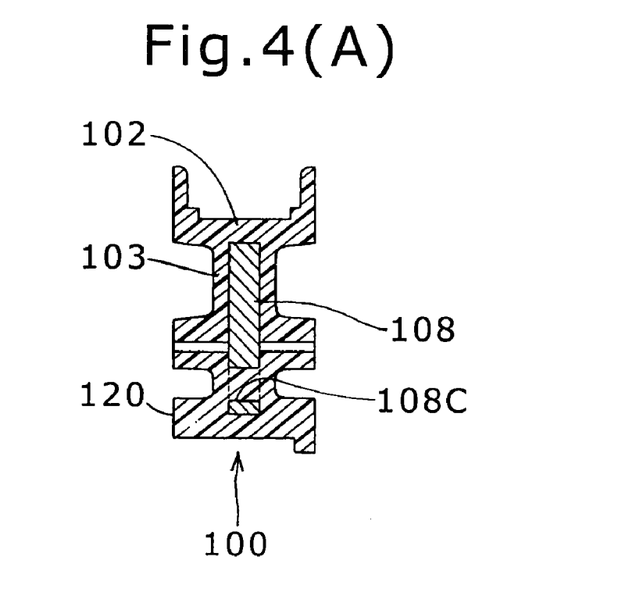
FIG. 4(A) is a cross sectional view taken on surface IVA-IVA in FIG. 3.
Figure 4B:
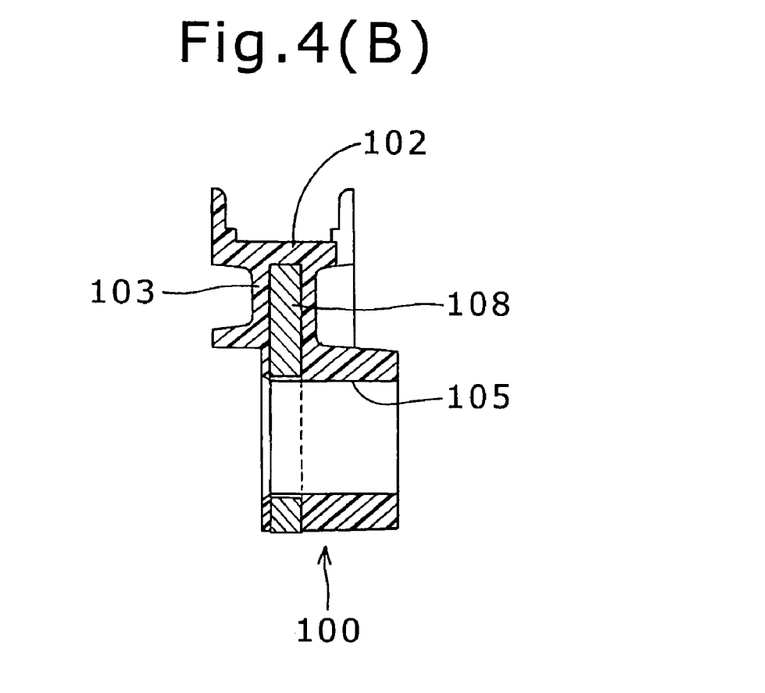
FIG. 4(B) is a cross-sectional view taken on surface IVB-IVB in FIG. 3.

In the embodiment depicted in FIGS. 3 and 4, the lever is substantially the same as the lever of FIG. 1, except that, near the front end of the lever, a tensioner plunger-abutting pad 120 is formed so that it is integral with the metal reinforcing plate 108. The same reference numerals as used in FIGS. 1, 2(A) and 2(B) are assigned to the corresponding parts in FIGS. 3, 4(A) and 4(B).

The tensioner plunger abutting pad 120 is integrated with the metallic reinforcing plate 108 by an insert molding method similar to the method by which the lever body 101 and the metal reinforcing plate 108 are integrated. By molding the tensioner plunger-abutting pad 120 in a split mold, the metal reinforcing plate 108, the lever body 101, and the tensioner plunger abutting pad 120 can be simultaneously integrated in one step.

In the embodiment shown in FIGS. 3 and 4(A), the plunger-abutting pad 120 and the lever body 101 are formed separately. Accordingly, even if extreme temperature changes are repeated, the generation of cracks and the like is prevented without excessive thermal stress on the lever body. Furthermore, to prevent the plunger-abutting pad 120 from separating from the metal reinforcing plate 108, a through hole 108C is provided in the reinforcing plate 108 at the position where the plunger-abutting pad 120 is formed. Accordingly, a synthetic resin flows into the through hole 108C in the process of insert mold molding, whereby the reinforcing plate 108 and the plunger abutting pad 120 are reliably secured to each other.

The lever for a transmission device according to the invention overcomes the problems of the conventional lever by integrating the lever body and the metal reinforcing plate by the use of insert molding, and further enhances the performance of a slide-in type tensioner lever. The applicability of the lever extends not only to a tensioner lever but also to a chain guide for limiting the traveling path of a chain. Therefore, the lever has a high degree of industrial significance.

The invention claimed is:

1. A lever for a transmission device comprising an elongated lever body including a shoe having a front surface adapted for sliding contact with a traveling transmission medium and a support extending longitudinally along the back of the shoe and substantially in a direction opposite to the direction in which the front surface of the shoe faces, said lever body being integrally molded of a synthetic resin, and a metal reinforcing plate held on said support at the center of the width direction of the support and extending longitudinally along the lever body, wherein the lever has a fixed part adjacent one end thereof, with a mounting hole at the location of said fixed part for receiving a pivot shaft on which the lever is pivotable, and a movable part adjacent the other end thereof, wherein said mounting hole extends through said support and through a through hole in said metal reinforcing plate, and wherein a part of said lever body and said metallic reinforcing plate are integrally insert-molded, the metal reinforcing plate being an insert fitting, and a part of the metallic reinforcing plate, between the fixed part of the lever and said other end of the lever, is exposed outside the lever body, whereby the generation of cracks in the lever body as a result of stress due to a difference in the rates of thermal expansion of the lever body and the reinforcing plate is avoided.

2. A lever for a transmission device according to claim 1, in which said mounting hole extends coaxially through said through hole in the reinforcing plate, the through hole having a diameter greater than the diameter of the mounting hole, and the mounting hole includes an annular layer of said synthetic resin forming a lining in said through hole in the reinforcing plate, the lining having an inner diameter equal to the diameter of the mounting hole, the inner circumferential surface of said mounting hole includes the inner circumferential surface of said annular layer and the inner circumferential surface of portions of the mounting hole on both sides of the reinforcing plate, whereby the inner circumferential surface of the mounting hole is a continuous surface formed by the same synthetic resin that forms said lever body.

3. A lever for a transmission device according to claim 2 having a tensioner plunger abutting pad integrally insert-molded with said metal reinforcing plate, said plate being an insert fitting.

4. A lever for a transmission device according to claim 1 having a tensioner plunger abutting pad integrally insert molded with said metal reinforcing plate, said plate being an insert fitting.

* * * * *

UNITED STATES PATENT AND TRADEMARK OFFICE
CERTIFICATE OF CORRECTION

PATENT NO.       : 7,252,609 B2                                          Page 1 of 1
APPLICATION NO.  : 10/851747
DATED            : August 7, 2007
INVENTOR(S)      : Hiroshi Hashimoto

It is certified that error appears in the above-identified patent and that said Letters Patent is hereby corrected as shown below:

On the Title page, under Item [56] FOREIGN PATENT DOCUMENTS please add the following:

DE 35 25 746 A1
  EP 1 306 581 A2
  DE 37 38 895 A1
  EP 1 312 830 A1
  EP 1 306 580 A1

Signed and Sealed this

Fourth Day of December, 2007

JON W. DUDAS
*Director of the United States Patent and Trademark Office*